United States Patent
Ji et al.

(10) Patent No.: US 8,285,145 B2
(45) Date of Patent: Oct. 9, 2012

(54) MODULAR COLORLESS AND DIRECTIONLESS MULTI-DEGREE RECONFIGURABLE OPTICAL ADD/DROP MULTIPLEXER NODE WITH IN-SERVICE UPGRADEABILITY

(75) Inventors: Philip N. Ji, Princeton, NJ (US); Yoshiaki Aono, Chiba (JP); Hiromitsu Sugahara, Chiba (JP); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 177 days.

(21) Appl. No.: 12/718,145

(22) Filed: Mar. 5, 2010

(65) Prior Publication Data

US 2011/0052201 A1    Mar. 3, 2011

Related U.S. Application Data

(60) Provisional application No. 61/238,406, filed on Aug. 31, 2009.

(51) Int. Cl.
*H04J 14/00* (2006.01)
*H04J 14/02* (2006.01)

(52) U.S. Cl. ................. 398/83; 398/45; 398/49; 398/50
(58) Field of Classification Search ................. 398/182, 398/183, 45, 48–50, 55–57, 82, 83
See application file for complete search history.

(56) References Cited

U.S. PATENT DOCUMENTS

| 2008/0013953 A1 | 1/2008 | Boduch et al. |
| 2009/0034978 A1 | 2/2009 | Gazzola et al. |
| 2009/0232447 A1* | 9/2009 | Boduch ......................... 385/24 |
| 2009/0232497 A1* | 9/2009 | Archambault et al. ......... 398/50 |

OTHER PUBLICATIONS

Roorda, P. et al., "Evolution to Colorless and Directionless ROADM Architectures", OFC/NFOEC Feb. 2008. 3 pages.
ADVA Optical Networking, "ROADM Network Design Issues" NFOEC 2009, Tutorial, Mar. 2009. 49 pages.

* cited by examiner

*Primary Examiner* — Dalzid Singh
(74) *Attorney, Agent, or Firm* — Joseph Kolodka; James Bitetto

(57) ABSTRACT

In a dense wavelength division multiplexed optical network, an upgradeable, modular, colorless, directionless, reconfigurable add/drop multiplexer having a small form factor. By using wavelength selective switches and couplers, the above features are achieved without the need for photonic cross connects.

12 Claims, 8 Drawing Sheets

MODULAR COLORLESS AND DIRECTIONLESS MULTI-DEGREE RECONFIGURABLE OPTICAL ADD/DROP MULTIPLEXER NODE WITH IN-SERVICE UPGRADEABILITY

RELATED APPLICATION INFORMATION

This application claims priority to provisional application Ser. No. 61/238,406 filed on Aug. 31, 2009, incorporated herein by reference.

BACKGROUND

1. Technical Field

The present invention relates to dense wavelength division multiplexed optical networks, and in particular to reconfigurable add/drop multiplexers for use in such networks.

2. Description of the Related Art

Reconfigurable Add/Drop Multiplexers (ROADM) are an important element in the dense wavelength division multiplexed (DWDM) optical network. ROADM nodes have been deployed in long haul and metro optical networks. In long haul networks a ROADM node is typically placed every several spans, while metro optical networks require denser placement of ROADM nodes, even up to one node per span. A ROADM node allows the flexible adding and dropping of any or all DWDM channels. Multi-degree ROADM nodes (nodes with 3 degrees or higher) also provide a cross-connection function for DWDM signals among different degrees. This function is also called wavelength cross-connect (WXC).

As the traffic of the network becomes more dynamic and the network topology evolves from ring to mesh or meshed ring, the limitations of prior art ROADM nodes become more significant. Two main limitations are colored transponder assignment and directed adding. The colored transponder assignment means that each transponder corresponds to a fixed wavelength (that is, a certain color), and therefore all transponders need to be preinstalled (high capital expense) or manually provisioned during system reconfiguration and upgrade (high operation expense). Because each end of an optical connection must use the same wavelength, the statically colored designs of the prior art greatly limit the flexibility of a network.

The directed adding issue refers to the fact that the outbound direction of the added signals is limited to the same degree and cannot reach other ROADM degrees (although with an optical protection switch, it can reach 2 degrees). This prevents the signals from being routed to different optical paths and thus further limits the flexibility of the node and the network.

Several architectures have been proposed to address these issues, but all of them suffer from a lack of in-service upgradeability, as they require large port-count photonic cross-connects (PXCs). PXCs are physically large and are unsuited for use in telecommunication-grade applications. The prior art architectures further suffer weaknesses in equipment reliability and node modularity.

SUMMARY

The present principles can be applied to create a modular, colorless, directionless, reconfigurable add/drop multiplexer (ROADM) node. Such a ROADM node may include a plurality of input splitters configured to split input signals, a plurality of transponder aggregators (TAs), each configured to receive a signal from each of the plurality of splitters and to select which signals get to drop, and a plurality of output wavelength-selective switches (WSSes), each configured to receive a signal from all but one of the splitters, to receive a signal from each of the TAs, and to select signals to drop for each degree of the node.

The ROADM node may be upgraded with a degree upgrade package according to the present principles. Such a package may include a plurality of upgrade input splitters, each of which is configured to operatively connect to an existing input splitter in a ROADM node, a plurality of upgrade TA wavelength-selective switches (WSSes), each of which is configured to operatively connect to an existing transponder aggregator (TA) in the ROADM node, a plurality of upgrade TA splitters, each of which is configured to operatively connect to an existing TA in the ROADM node, and a plurality of upgrade output WSSes, each of which is configured to operatively connect to an existing output WSS in the ROADM node.

The ROADM node may also be upgraded with an add/drop channel upgrade package according to the present principles. Such a package may include a plurality of upgrade TA wavelength-selective switches (WSSes), each of which is configured to operatively connect to an existing transponder aggregator (TA) in the ROADM node and a plurality of upgrade TA couplers, each of which is configured to operatively connect to an existing TA in the ROADM node.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
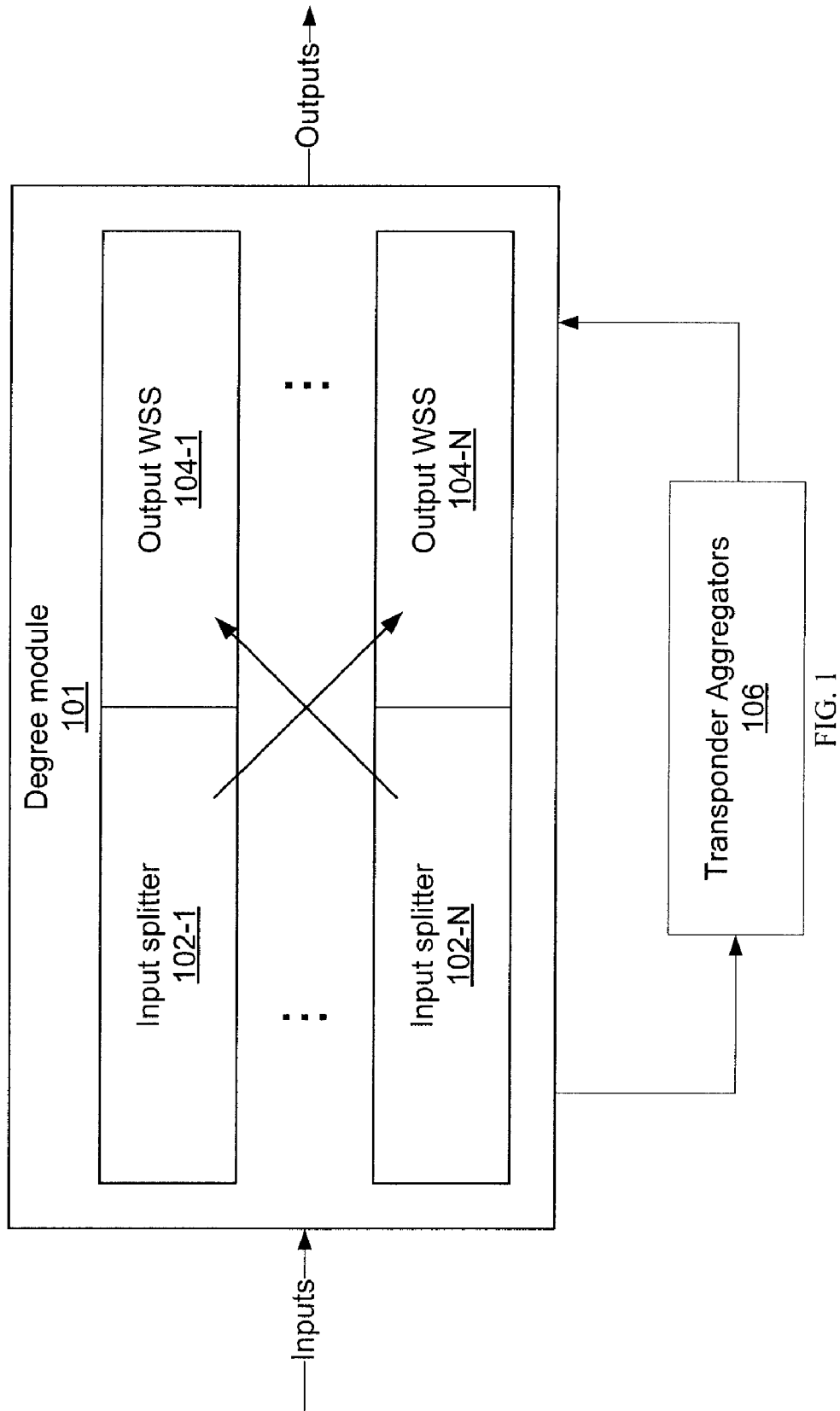
FIG. 1 shows a block diagram of a multi-degree Reconfigurable Add/Drop Multiplexer (ROADM) node according to the present principles.

The present principles describe a reconfigurable add/drop multiplexer (ROADM) with colorless, directionless drops. Referring generally to FIG. 1, an embodiment of the present principles is shown which provides colorless, directionless transponders that allow for in-service upgradeability while maintaining modularity and a small form factor.

Embodiments disclosed herein may be implemented primarily in hardware. Control logic for the present embodiments may be implemented entirely in software or including both hardware and software elements. Such software may include firmware, resident software, microcode, etc., and may be executed by some variety of processor.

To overcome the limitations of the prior art, multi-degree ROADM nodes may be made that are colorless and directionless. The colorless feature means that the add/drop ports are not wavelength specific and any transponder can be tuned to any dense wavelength division multiplexed (DWDM) channel. This feature allows full automation of wavelength assignment and a pay-as-you-grow investment strategy. The directionless feature means that for any channel dropped at the local node, the corresponding added channel can go to any output port, regardless of which input port it comes from. Directionlessness allows more efficient sharing of transponders in a node among different paths, and improves the protection scheme.

Referring now to the drawings in which like numerals represent the same or similar elements and initially to FIG. 1, a basic layout for an N-degree ROADM node is shown which is colorless and directionless. A set of N inputs arrive at the node and pass to degree module 101. The degree module 101 comprises a set of N splitters 102 and wavelength-selective switches (WSSes) 104. Each splitter 102 is associated with one WSS 104. The inputs are split at splitters 102, with each of the N splitters sending one signal to N−1 of the N output WSSes 104 (i.e., all but the splitter's associated WSS) and one signal to each of the N transponder aggregators (TAs) 106. The TAs 106 select which channels to drop according to selection logic (not shown) and then pass the signals on to the output WSSes 104.

Figure 2:
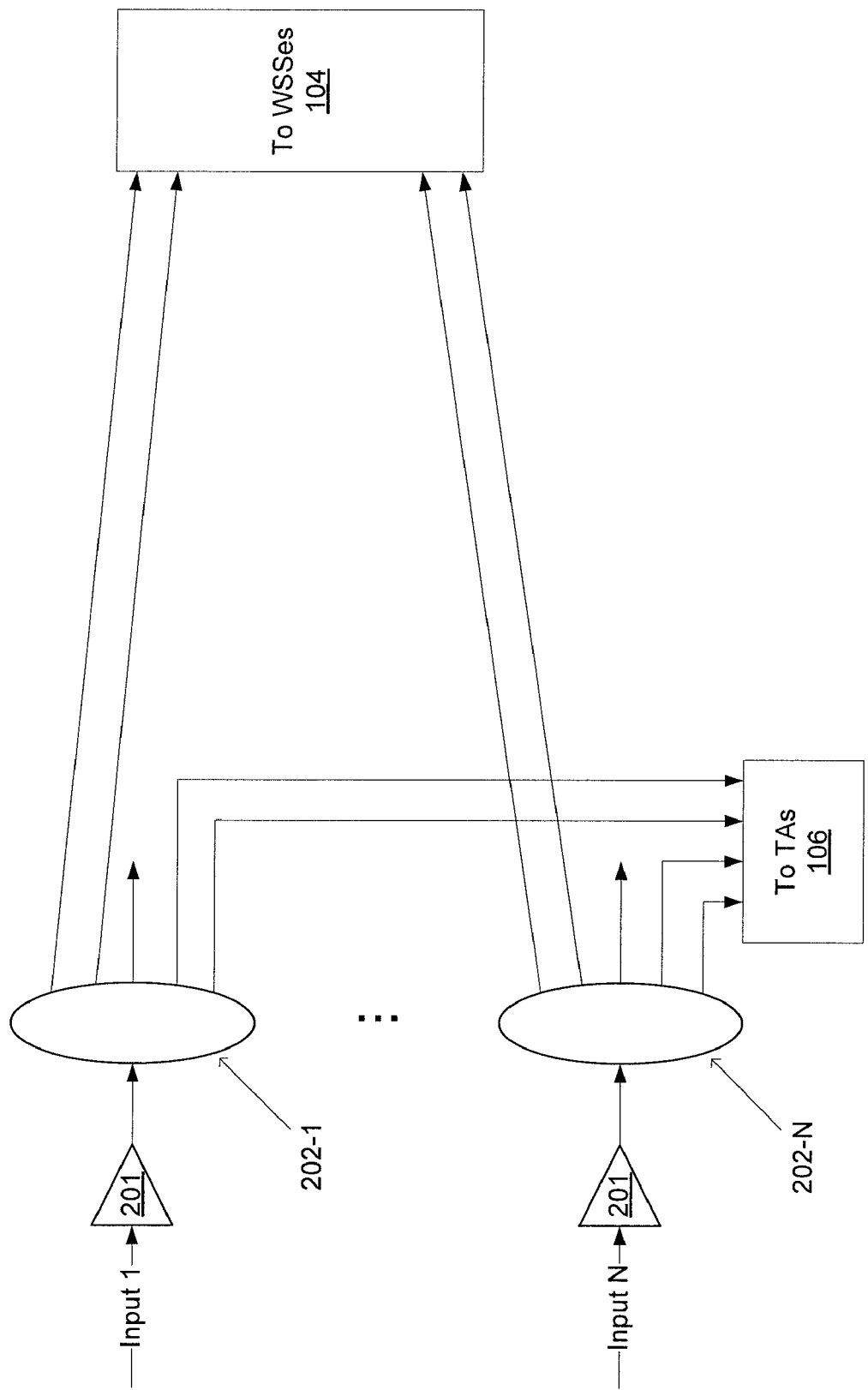
FIG. 2 shows an exemplary design for inputs and splitters used in a ROADM node according to the present principles.
Figure 3:
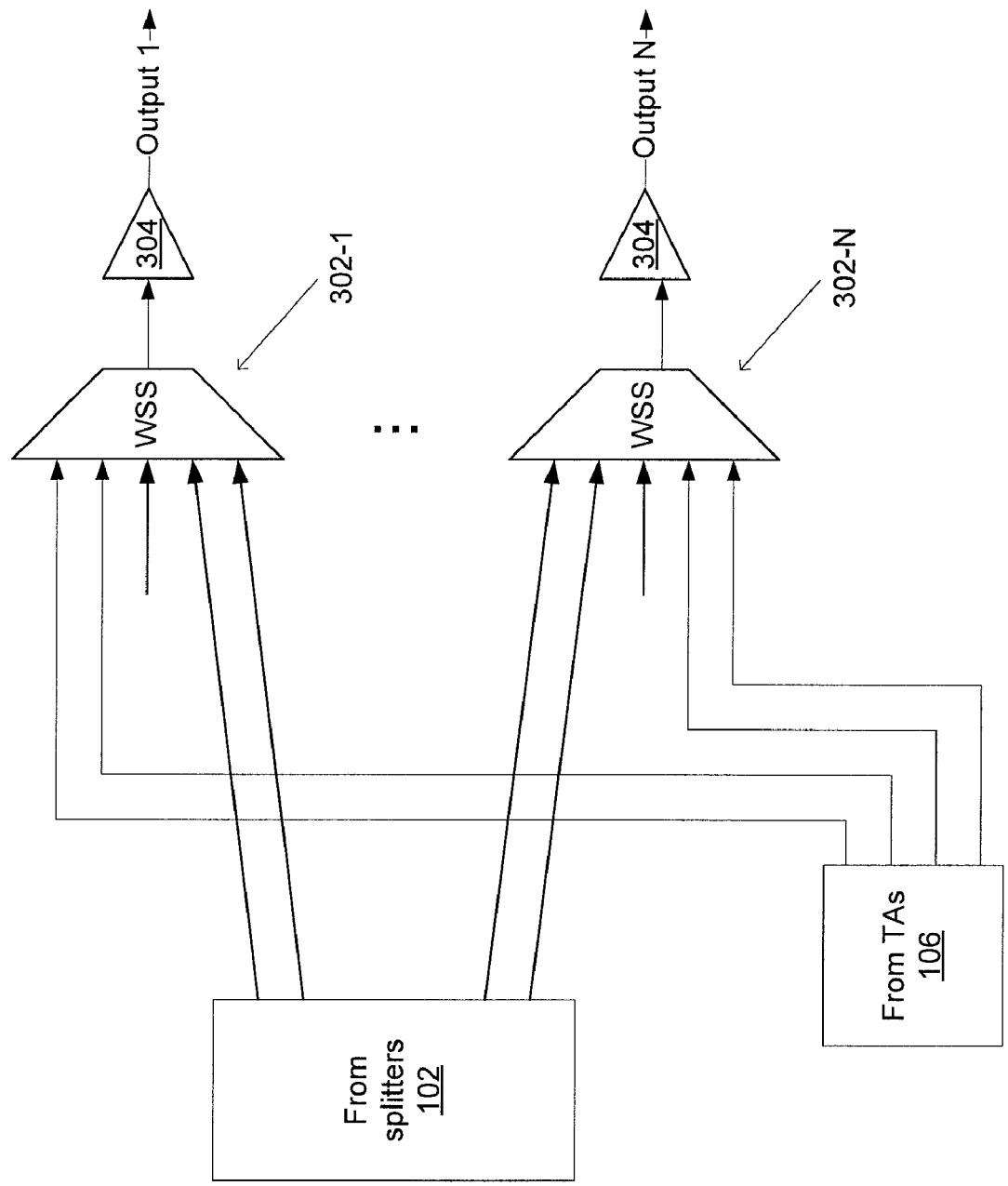
FIG. 3 shows an exemplary design for outputs and wavelength-selective switches (WSSes) used in a ROADM node according to the present principles.
Figure 4:
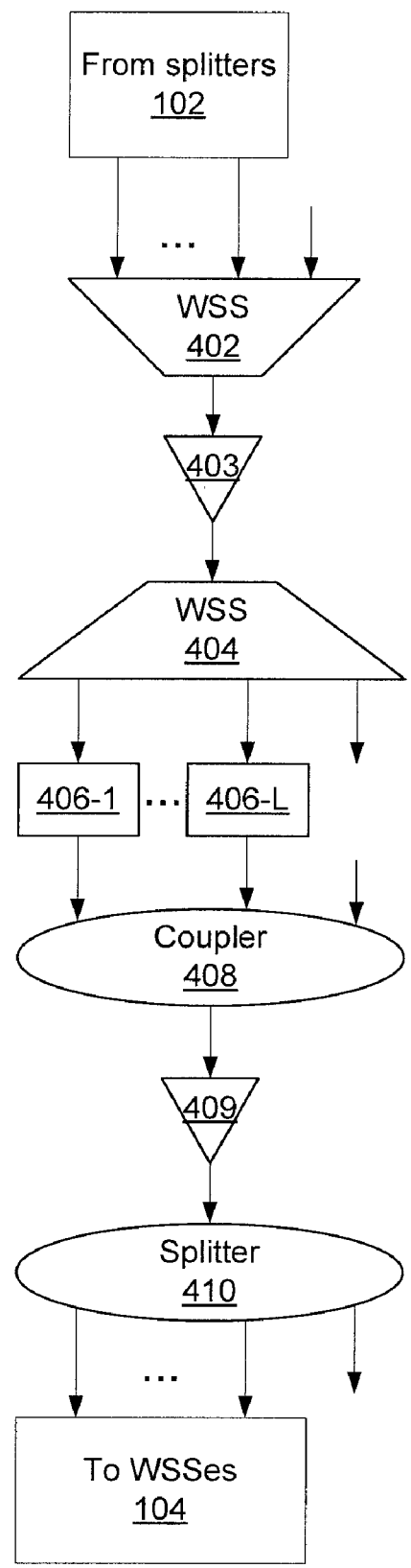
FIG. 4 shows an exemplary design for transponder aggregators (TAs) used in a ROADM node according to the present principles.

Referring now to FIG. 2, the input splitters 102 are shown in detail. Throughout FIGS. 2-4 are inputs and outputs which do not lead directly to shown components. These represent open ports to allow for future upgrading. At each input port, the N input signals are each amplified in amplifiers 201 and then are equally split into 2N paths by optical splitters 202-1 through 202-N. Of these 2N paths, N−1 paths are sent to the output WSSes 104 as cross-connect signals (note that each input splitter connects to N−1 of the WSSes). The remaining N paths are sent to N TAs 106. Additionally, each splitter 202-1 through 202-N has an extra output. The extra output is to allow for the introduction of an upgrade module, as will be discussed in greater detail below.

Referring now to FIG. 3, greater detail on the WSSes 104 is shown. Signals from the splitters 102 and the TAs 104 arrive at a set of N 2N×1 WSSes 302-1 through 302-N. 2N−1 inputs arrive from the splitters, while 2N arrive from the TAs. The final inputs to the WSSes 302 represent an open port that allows for future upgradeability. The WSSes select particular channels to drop along a given output and pass them to amplifiers 304 before the signals leave the ROADM node.

Referring now to FIG. 4, detail on the TAs 106 is shown. Inputs arrive at a TA from splitters 102. The N inputs pass to a (N+1)×1 WSS 402, leaving one port open on the WSS 402 for an upgrade module. The WSS 402 selects the channels which are to be dropped at the TA and outputs them to an optical amplifier 403, which in turn outputs to a 1×(L+1) WSS 404.

Besides the channel selection, the (N+1)×1 WSS 402 also ensures that there is no wavelength contention within a given TA. In other words, there should not be channels with the same wavelength from different input ports to be dropped at a TA. Even though at first blush this seems to cause a wavelength blocking problem, any wavelength(s) from any input port can always be dropped at the ROADM node. Since there are, e.g., N TAs in the node and there are at most, e.g., N channels from the input ports with any particular wavelength, these signals with the same wavelength can be distributed among N TAs and be dropped locally simultaneously without conflict.

The 1×(L+1) WSS 404 in the TA selects the particular L DWDM channels to drop to transponders 406-1 through 406-L. Again, one port is left open for future upgrade. Here L is the average allowed number of local add/drop channels per degree. Altogether there are N×L dropped channels in a multi-degree ROADM node according to the present principles, so the add/drop ratio is L/K, where K is the maximum number of channels from each input degree. Among the L+1 outputs of the 1×(L+1) WSS 404, L outputs contain one channel each, which are dropped to L colorless transponders 406-1 through 406-L respectively. Note that L is just an average number and not a maximum figure allowed for each degree. For example, in an extreme case, one input port can drop all of its K channels while other input ports do not have any local add/drop, provided that K≦N×L.

The L transponders 406 provide their outputs (the added signals) to an (L+1):1 coupler, leaving one port open for upgrade. The coupler 408 combines the L+1 inputs and provides a single output to optical amplifier 409. The amplified signal is then split N+1 ways in 1:(N+1) splitter 410. N of the split signals are then provided to output WSSes 104, leaving one additional output of the splitter 410 available for future upgrade. Each splitter 410 provides one of its outputs to each of the output WSSes 302 described above with respect to FIG. 3, such that each output WSS 302 receives one signal from each of the TAs 106.

The (L+1):1 coupler 408 and the 1:(N+1) splitter 410 are used instead of a combined (L+1):(N+1) coupler. This leads to an increased insertion loss, but allows a single point for the placement of amplifier 409. If the optical loss of such a combined coupler can be fully compensated at the output end of the node, the combination will reduce hardware cost and size. Present technologies make the division of splitter and coupler more preferable, but as integrated amplifier arrays improve, it may become advantageous to use the alternative design.

The transponders 406 may be implemented as separate from the TAs 106, being merely connected to the TAs as required and being dynamically reassignable. The available transponders may be distributed evenly between the TAs, and additional transponders may be added as needed.

As noted above, there are several locations left open in the disclosed architecture which may be utilized for in-service upgrades. The number of degrees, as well as the number of add/drop channels, may be upgraded. These two functions may be upgraded through separate modules, allowing for a pay-as-you-grow investment strategy. When showing components added during upgrade, the figures depict such components using dashed lines.

Figure 5:
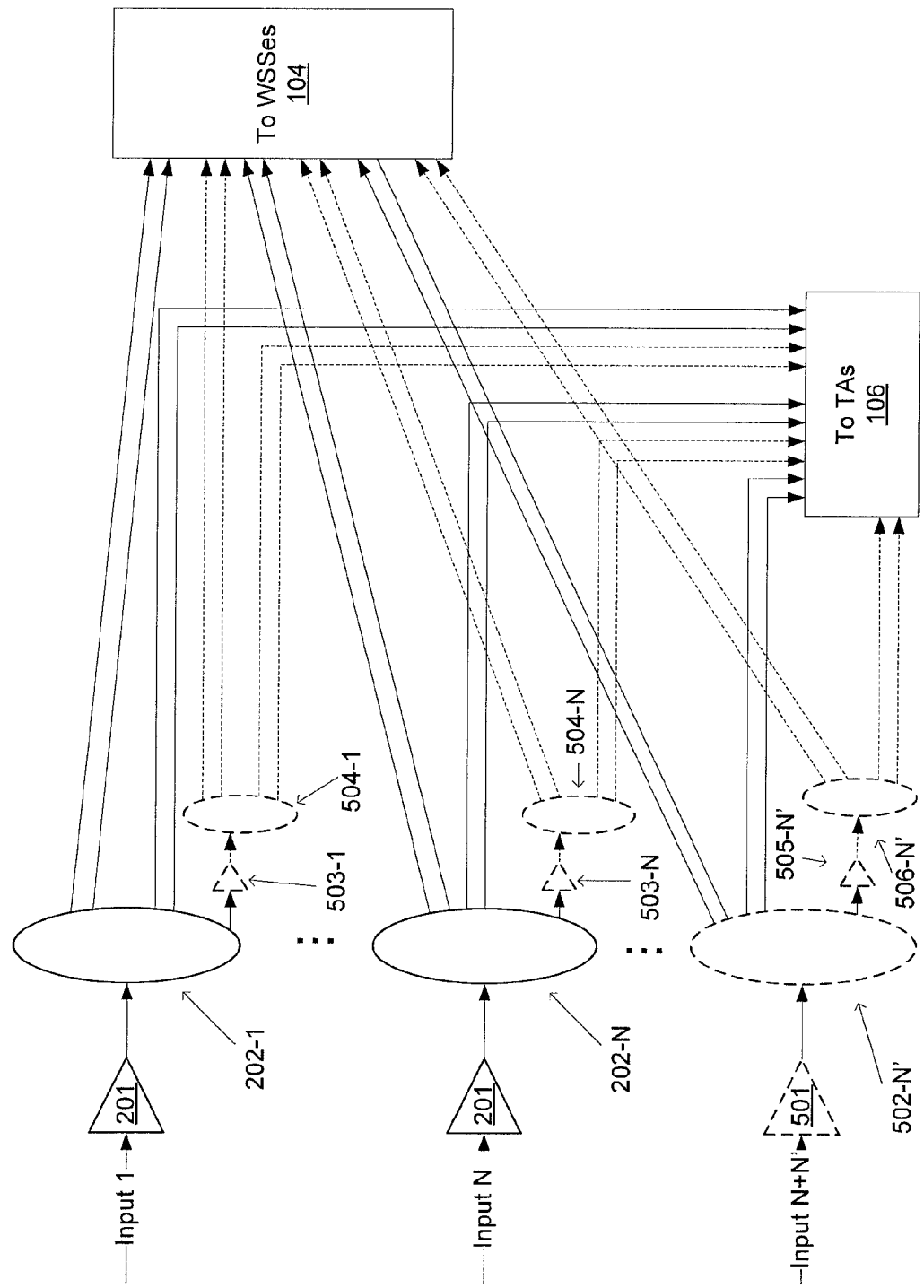
FIG. 5 shows an exemplary design for a ROADM node that has upgraded inputs and splitters according to the present principles.

Referring now to FIG. 5, another view of splitters 102 is shown after the addition of an upgrade module. Upgrade components are shown with dotted lines. An upgrade module introduces a new set of amplifiers 503-1 through 503-N and a new set of 1:2 N' splitters 504-1 through 504-N which connect to the extra output of splitters 202-1 through 202-N respectively. N' represents the number of added degrees introduced by the upgrade module. Each upgrade splitter 504 then provides 2N' outputs, N' of which go to the TAs 106 and N' of which go to the WSSes 104.

Additionally, entirely new degrees are added. FIG. 5 shows additional inputs N+1 through N+N', each leading to a new amplifier 501 and splitter 502. They are, in turn, provided with upgrade amplifiers 505 and splitters 506 (which are identical to amplifiers 503 and splitters 504 respectively). In one embodiment, the splitters 502 are identical to splitters 202, but in an alternative embodiment they are designed to incorporate upgrade splitters 506, in which case splitters 502 would be 1:(2N+2N'−1) splitters. The latter embodiment sacrifices some modularity for simpler components and ease of upgrade.

Figure 6:
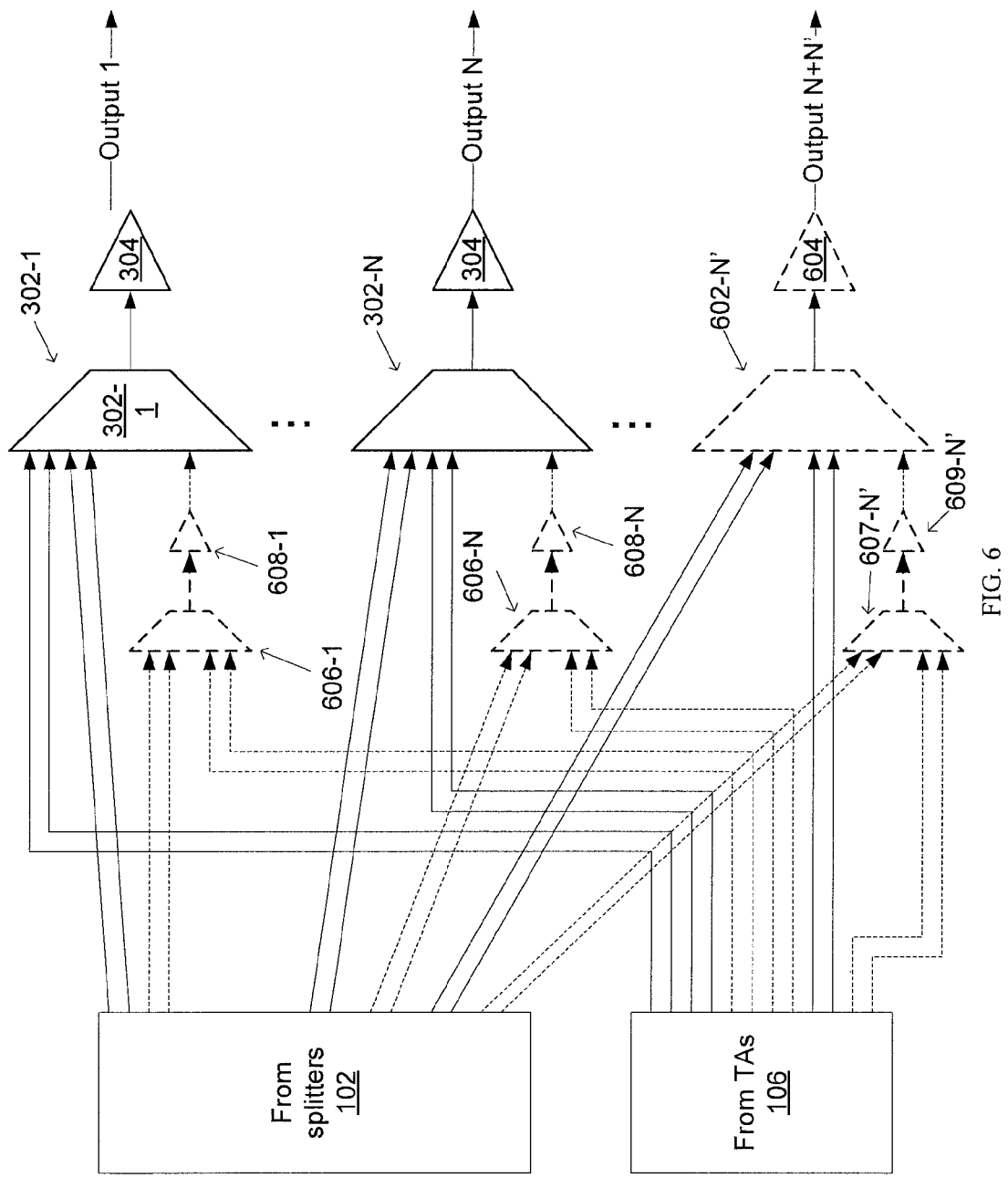
FIG. 6 shows an exemplary design for a ROADM node that has upgraded outputs and WSSes according to the present principles.

Referring now to FIG. 6, another view of WSSes 104 is shown after the addition of an upgrade module. The upgrade module introduces additional 2N'×1 WSSes 606-1 through 606-N, along with optical amplifiers 608-1 through 608-N. These upgrade WSSes receive N signals from the upgrade splitters 504, shown in FIG. 5, and N signals from upgrade TAs included in upgrade package 804, shown in FIG. 8.

Additionally, entirely new degrees are added. FIG. 6 shows additional outputs N+1 through N+N'. Each new output has respectively a new amplifier 604 and WSS 602. The new WSSes 602 are, in turn, provided with upgrade amplifiers 609 and upgrade WSSes 607 (which are identical to upgrade amplifiers 608 and splitters 606 respectively). In one embodiment, the new WSSes 602 are identical to WSSes 302, but in an alternative embodiment they are designed to incorporate upgrade WSSes 607, in which case the WSSes 602 would be (2N+2N'−1)×1 WSSes. The latter embodiment sacrifices some modularity for simpler components and ease of upgrade.

Figure 7:
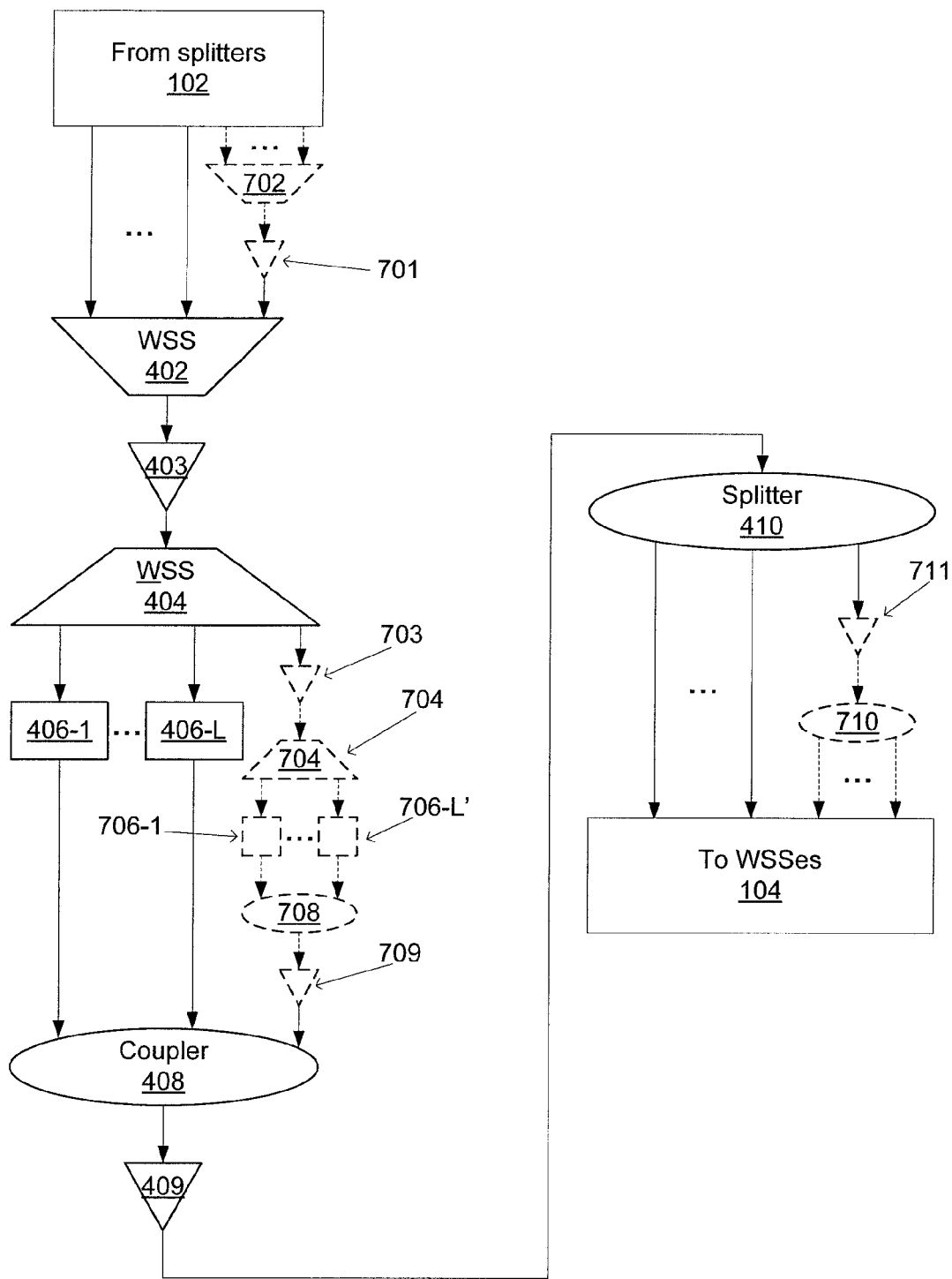
FIG. 7 shows an exemplary design for an upgraded TA according to the present principles.

Referring now to FIG. 7, a detailed view of a TA is shown after the addition of upgrade modules. As compared to FIG. 4, an additional N' signals come from splitters 102. As part of upgrading the node's degree, an additional N'×1 WSS 702 is added, along with an amplifier 701, to accept the new signals (in an alternative embodiment, amplifier 701 may not be necessary if these channels have already been sufficiently amplified by amplifiers 503-1 through 503-N). The amplifier 703 is connected to the upgrade port of (N+1)×1 WSS 402. As shown in FIG. 4, the output of WSS 402 is amplified at amplifier 403 before passing to a 1×(L+1) WSS 404. Connected to the WSS 404 are L transponders 406-1 through 406-L. Additionally, connected to the WSS's upgrade port, an upgrade 1×L' WSS 704 is connected which increases the average number of add/drop channels to L+L'. 1×L' WSS 704 outputs to L' transponders 706-1 through 706-L', which in turn output signals to an upgrade coupler 708. The output signal from the upgrade coupler 709 is amplified by optical amplifier 709 before going to the original coupler 408.

It is worth noting that the upgrades to the TAs 106 represent improvements to two separate functions, and thus may be implemented separately. The addition of WSS 702 and splitter 710 relates to the addition of new degrees to the node, whereas the addition of WSS 704 and coupler 708 relates to the addition of new add/drop channels.

The original coupler 408 combines the L original signals from transponders 406-1 through 406-L with the combined signal from the L' upgrade transponders 706-1 through 706-L' and produces an output that is amplified in optical amplifier 409. This signal is, in turn, split into N+1 signals by original splitter 410. Connected to the upgrade port of original splitter 410 is an amplifier 711 and an upgrade splitter 710. The upgrade splitter 710 produces N' outputs, each of which goes to one of the WSSes 104.

As above with transponders 406, the transponders 706 may be implemented separately from the TAs 106 and, correspondingly, separate from any upgrade package. The transponders 706 are connected to WSS 704 and coupler 708, but may be dynamically reassigned between the TAs.

The upgrade components described above can be added as discrete upgrades, or they can be grouped into upgrade "packages." The upgrades discussed herein are directed to two characteristics of the ROADM node: the number of degrees and the number of add/drop channels. These two functions can be upgraded together or independently. Additionally, it is contemplated that the present principles may be applied to allow for multiple upgrades. This may be accomplished by including multiple upgrade ports in the original equipment, or by using upgrade packages which themselves have upgrade ports. The latter configuration allows for cascading upgrades, though at the loss of some optical signal-to-noise ratio (OSNR).

Figure 8:
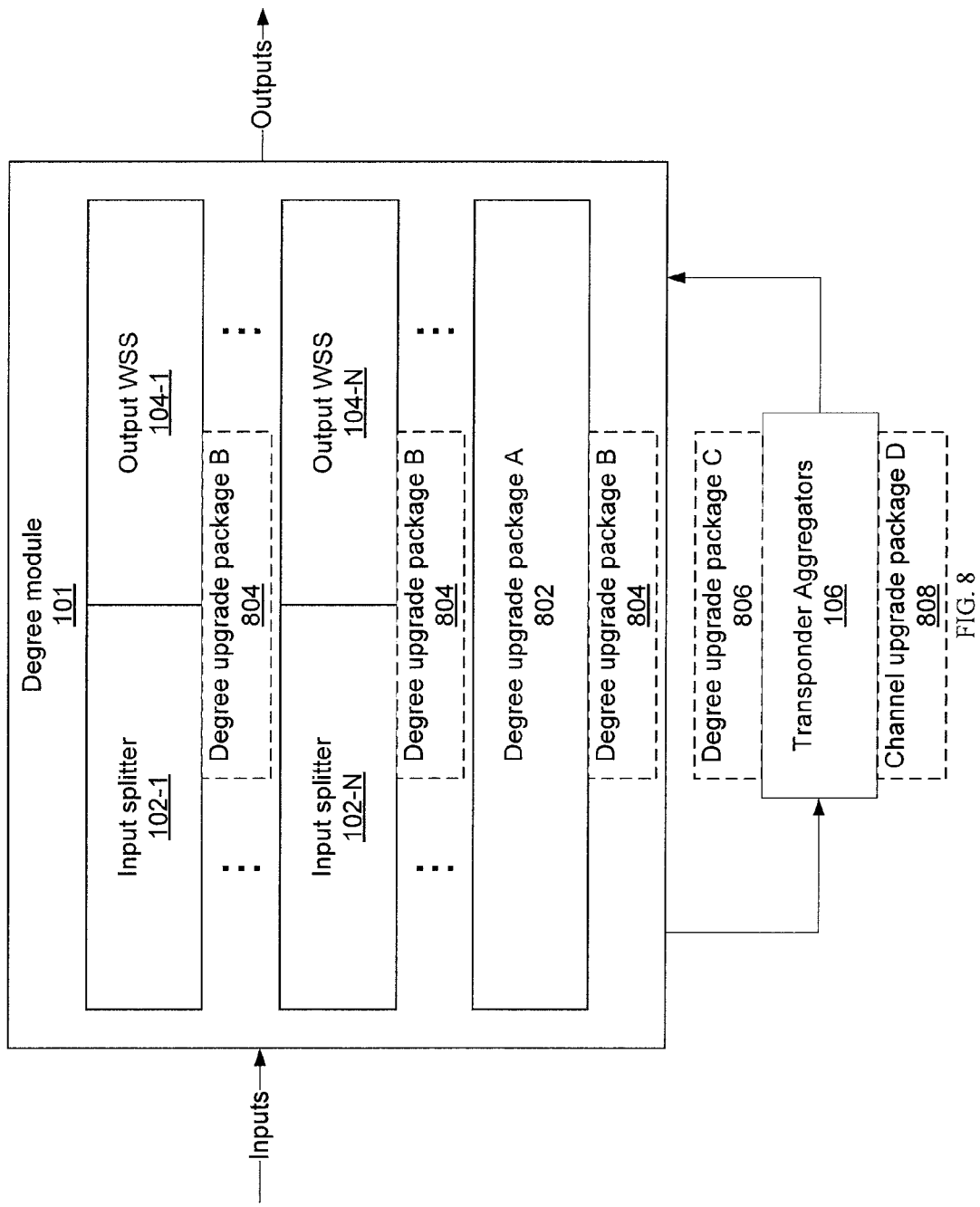
FIG. 8 shows a block diagram illustrating upgrade packages to be used in a ROADM node according to the present principles.

Referring now to FIG. 8, a set of upgrade modules are shown in relation to the broadly described functions of FIG. 1. Three packages are shown. Packages A, B, and C relate to upgrade of the node's degrees, whereas package D relates to upgrade of the node's channels. Each package A 802 introduces a new splitter and WSS, shown for example as 502 and 602 in FIGS. 5 and 6 respectively, as well as their respective amplifiers. Package B 804 meanwhile provides upgrade splitters, WSSes, and their respective amplifiers as shown in FIGS. 5 and 6. It should be noted that one package B 804 is added to each of the new degrees introduced by the packages A 802 as well. Package C 806 meanwhile introduces new splitters, WSSes, and TAs to accommodate the new degrees, as shown in FIG. 7. Package C 806 introduces WSS 702, splitter 710, and their respective amplifiers from FIG. 7 for each TA in order to allow the original TAs to use the new degrees (with the addition of the amplifier being optional in the case of sufficient amplification in package B). Also introduced by package C 806 are a set of N' new TAs, corresponding to the N' new degrees introduced by the new packages A 802. The addition of packages A, B, and C allow for an increase in the number of degrees that a ROADM node can handle.

Package D 808 meanwhile introduces WSS 704, amplifier 703, coupler 708, and amplifier 709 to each installed TA (whether original or added by an upgrade package as described above). Package D 808 upgrades the TAs (both the original and the upgrade TAs) to increase their average add/drop channels. As shown, package D 808 interacts with the original TAs 106, the transponders 406 and 706, as well as upgrade package A in order to ensure that all TAs have the increased capacity.

Even though the amplifiers in the upgrade packages can compensate for additional optical loss caused by the operation of the upgrade components and restore the peak power level for the signals passing through these packages, they also cause additional OSNR penalty since the noise level will be increased. Therefore the OSNR property among all input channels becomes imbalanced after the node upgrade. This should be taken into consideration when specifying the receiver sensitivity requirement.

In an exemplary embodiment of the present principles, a ROADM node may be designed having eight degrees, 88 channels with 50 GHz channel spacing, and 20 add/drop channels per degree. This initial architecture may then be upgrade to 20 degrees with 88 add/drop channels per degree.

The ROADM nodes described above with respect to the figures may be reconfigured and upgraded in-service, without affecting existing traffic. For example, in the case of an outage in one link, such as a cut fiber, signals can be rerouted to a different link, through a different output port, provided that the wavelengths are not already occupied in the new fiber link. Thanks to the directionless design of the above architecture, this reconfiguration can be done remotely via software-based control and management.

Colorlessness is another advantageous feature of the present principles. As noted above, colorlessness means that add/drop ports are not wavelength specific and that any transponder can be tuned to any DWDM channel. The present principles allow any one channel from any input port to be dropped at any transponder in the combined transponder bank among all the TAs. Since the input channels are broadcast to all TAs, this particular channel just needs to be selected by the appropriate TA using an N×1 WSS (e.g., 402) and then sent to the target transponder using a 1×L WSS (e.g., 408). The transponders may be colorless with wide band receivers and tunable optical sources.

However, the strictest definition of colorless drop operation is that the colorless drop capability described above can be applied to all dropped channels, provided that no more than one channel will be dropped at each transponder (i.e., signal contention). Sometimes this feature is referred to as "fully colorless."

As applied to the present architecture, in each TA, only one channel with a given wavelength may be selected due to the wavelength blocking characteristics of the TA. This issue can generally be solved by proper wavelength assignment and placement of the transponders. If the number of transponders to be installed is less than N×L, the transponders should be added in such a manner that they are divided as equally as possible among the N TAs.

For example, if an 8×8 node allows up to 20 add/drop channels per degree, but there are only 36 transponders installed at first (out of a possible 8×20=160 transponders), the transponders should be divided among the 8 TAs such that 4 TAs have 4 transponders each and the other 4 TAs have 5 transponders each. To achieve this even distribution, the transponders may be assigned to the TAs in a cyclical manner. This will ensure the most even assignment possible and will minimize any possible color conflicts.

Within each TA, all selected channels have full colorless drop capability, because each one of them can be dropped to any transponder linked to the particular TA. The main purpose for having colorlessness in a ROADM node is to allow a smaller amount of transponders to receive any combination of channels dropped from the inputs, so long as the total number of dropped channels does not exceed the amount of transponders available in the local node. By having this capability, the network owner can build the network with a pay-as-you-grow strategy and can dynamically configure the local add/drop operation.

A ROADM node according to the present principles does offer such capability. For a system with N×L transponders, any one of up to N×L channels within a total of N×K input channels can be dropped locally. There are no restrictions on the wavelengths (as multiple channels can have the same wavelength) and are no restrictions on the input port. As such, the present principles provide colorless capability. This architecture allows any add/drop combination to be achieved across the TAs. If multiple channels with the same wavelength need to be dropped locally, they will be distributed among different TAs. Since the possible number of channels having the same wavelength will not exceed the number of TAs, all drop requests for that wavelength can be met.

Recent progress in WSS and photonic component integration offer the possibility to reduce the ROADM node hardware size. Firstly, the WSS port count can be expanded through new microelectromechanical systems (MEMS) mirror design while not requiring significant size increase. Secondly, the control electronics for the WSS and other components can be moved onto the main circuit board of the optical package, reducing the size of individual components. Thirdly, the photonic integration technology allows the high density integration of passive and active components such as couplers, filters, switches, isolators and monitors. As a result of these advances, architectures according to the present principles can be greatly reduced in size, particularly when compared to prior art photonic cross-connect devices.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A reconfigurable add/drop multiplexer (ROADM) node, comprising:
    a plurality of input splitters configured to split input signals;
    a plurality of transponder aggregators (TAs), each configured to receive a signal from each of the plurality of splitters and to select which signals get to drop; and
    a plurality of output wavelength-selective switches (WSSes), each configured to receive a signal from respective ones of the splitters, to receive a signal from each of the TAs, and to select signals to drop for each degree of the node;
    wherein the input splitters are 1:(2N) splitters, providing N signals to the TAs, N−1 signals to the output WSSes, and having one upgrade output configured for connection to an upgrade input splitter, where N is the number of degrees of the node.

2. The ROADM node of claim 1, further comprising a plurality of upgrade input splitters, each connected an input splitter and producing 2N' outputs, where N' is a number of added degrees.

3. The ROADM node of claim 1, wherein the output-WSSes are (2N+1)×1 WSSes, receiving N signals from the input splitters, N signals from the TAs, and having one upgrade input configured for connection to an upgrade output-WSS.

4. The ROADM node of claim 3, further comprising a plurality of upgrade output-WSSes, each connected to an output-WSS, receiving 2N' inputs, where N' is a number of added degrees.

5. The ROADM node of claim 3, wherein the TAs each comprise:
    a first WSS that accepts signals from the input splitters and outputs a combination of one or more selected signals;
    a second WSS that accepts the combination of selected signals and outputs it to one or more selected transponders, each transponder being configured to drop a signal on a given channel;
    a coupler that combines the outputs of the selected transponders and outputs the combined transponder outputs to the output-WSSes.

6. The ROADM node of claim 5, wherein the first WSS is an (N+1)×1 WSS having an input that may be connected to a first upgrade WSS, and the second WSS is a 1×(L+1) WSS having an output that may be connected to a second upgrade WSS, where L is the average number of add/drop channels.

7. The ROADM node of claim 6, further comprising a first upgrade WSS connected to the first WSS of each TA, receiving N' inputs, where N' is the a number of added degrees.

8. The ROADM node of claim 6, further comprising a second upgrade WSS connected to the second WSS of each TA, producing L' outputs, where L' is a number of added add/drop channels.

9. The ROADM node of claim 5, wherein the coupler is an (L+1):(N+1) coupler.

10. The ROADM node of claim 5, further comprising a 1:(N+1) splitter, wherein the coupler is an (L+1):1 coupler and outputs combined signals to the 1:(N+1) splitter.

11. The ROADM node of claim 10, wherein the (L+1):1 coupler has an input configured for connection to an upgrade coupler and the 1:(N+1) splitter has an output configured for connection to an upgrade splitter.

12. The ROADM node of claim 11, further comprising:
an upgrade coupler connected to the coupler of each TA, having L' inputs, where L' is a number of added add/drop channels; and
an upgrade splitter connected to the splitter of each TA, having N' outputs, where N' is a number of added degrees.

* * * * *